US012293534B2

(12) United States Patent
Gomi et al.

(10) Patent No.: US 12,293,534 B2
(45) Date of Patent: May 6, 2025

(54) IMAGING DEVICE, INFORMATION PROCESSING DEVICE, IMAGING METHOD, AND INFORMATION PROCESSING METHOD

(71) Applicant: SONY GROUP CORPORATION, Tokyo (JP)

(72) Inventors: Shinichiro Gomi, Tokyo (JP); Teppei Kurita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 395 days.

(21) Appl. No.: 17/756,776

(22) PCT Filed: Dec. 4, 2020

(86) PCT No.: PCT/JP2020/045246
§ 371 (c)(1),
(2) Date: Jun. 2, 2022

(87) PCT Pub. No.: WO2021/117633
PCT Pub. Date: Jun. 17, 2021

(65) Prior Publication Data
US 2023/0342963 A1     Oct. 26, 2023

(30) Foreign Application Priority Data

Dec. 13, 2019   (JP) ................. 2019-225887

(51) Int. Cl.
*G06T 7/586*       (2017.01)
*G01B 11/24*       (2006.01)
(Continued)

(52) U.S. Cl.
CPC .............. *G06T 7/586* (2017.01); *G01B 11/24* (2013.01); *H04N 23/56* (2023.01); *H04N 25/10* (2023.01); *G02B 27/288* (2013.01)

(58) Field of Classification Search
CPC .......... G06T 7/586; G06T 2207/10152; H04N 23/56; H04N 25/10; H04N 23/60;
(Continued)

(56) References Cited

U.S. PATENT DOCUMENTS

| 10,108,261 | B1 | 10/2018 | Hall | |
|---|---|---|---|---|
| 2010/0303344 | A1* | 12/2010 | Sato ....................... | H04N 23/84 |
| | | | | 382/162 |

(Continued)

FOREIGN PATENT DOCUMENTS

| CN | 101013028 A | 8/2007 |
|---|---|---|
| CN | 101044507 A | 9/2007 |

(Continued)

OTHER PUBLICATIONS

International Search Report and Written Opinion of PCT Application No. PCT/JP2020/045246, issued on Feb. 22, 2021, 09 pages of ISRWO.

(Continued)

*Primary Examiner* — Wassim Mahrouka
(74) *Attorney, Agent, or Firm* — CHIP LAW GROUP

(57) ABSTRACT

An imaging device includes an imaging unit, a signal separating unit, a normal line calculating unit, and a distance estimation unit. The imaging unit includes a plurality of polarization lights having different polarization directions of light emitted to a subject and a polarization sensor that captures an image of the subject that is simultaneously irradiated with the light from the plurality of polarization lights. The signal separating unit separates pixel signals corresponding to each of the polarization directions from the image captured by the imaging unit and generates an image for every polarization direction. The normal line calculating unit calculates a normal line on a surface of the subject from the image for each of the polarization directions by photo- (Continued)

metric stereo. The distance estimation unit estimates the shape of the subject based on the normal line calculated by the normal line calculating unit.

8 Claims, 11 Drawing Sheets

(51) Int. Cl.
*G02B 27/28* (2006.01)
*H04N 23/56* (2023.01)
*H04N 25/10* (2023.01)

(58) Field of Classification Search
CPC ...... G02B 27/288; G03B 11/00; G03B 15/02; G03B 15/03; G03B 35/08
See application file for complete search history.

(56) References Cited

U.S. PATENT DOCUMENTS

| | | |
|---|---|---|
| 2011/0304705 A1 | 12/2011 | Kantor |
| 2014/0118502 A1 | 5/2014 | Jang |
| 2014/0168382 A1 | 6/2014 | Jang |
| 2019/0178633 A1 | 6/2019 | Kimura |
| 2020/0184665 A1* | 6/2020 | Ikemoto ................ H04N 23/56 |

FOREIGN PATENT DOCUMENTS

| | | |
|---|---|---|
| CN | 101356546 A | 1/2009 |
| CN | 101960859 A | 1/2011 |
| CN | 102047651 A | 5/2011 |
| CN | 103037752 A | 4/2013 |
| CN | 103458761 A | 12/2013 |
| CN | 103826530 A | 5/2014 |
| CN | 106061385 A | 10/2016 |
| CN | 106817543 A | 6/2017 |
| CN | 107251553 A | 10/2017 |
| CN | 107533370 A | 1/2018 |
| CN | 107847130 A | 3/2018 |
| CN | 108267896 A | 7/2018 |
| CN | 109285213 A | 1/2019 |
| CN | 109642787 A | 4/2019 |
| JP | 2012143363 A | 8/2012 |
| JP | 2012173916 A | 9/2012 |
| JP | 2016008954 A | 1/2016 |
| JP | 2017-072499 A | 4/2017 |
| WO | WO-2010073547 A1 | 7/2010 |
| WO | WO-2012039086 A1 | 3/2012 |
| WO | WO-2019021569 A1 | 1/2019 |

OTHER PUBLICATIONS

Gu Guozhang, et al, "Research on 3D Reconstruction of Transparent Object", Journal of Changchun University of Science and Technology (Natural Science Edition), vol. 31, No. 1, Mar. 15, 2008, pp. 1-4.

Hao Jinglei, et al, "3D Reconstruction of High-reflective and Textureless Targets Based on Multispectral Polarization and Machine Vision", Acta Geodaetica et Cartographica Sinica, vol. 47, No. 6, Jun. 15, 2018, pp. 1-9.

* cited by examiner

| LIGHT SOURCE SIGNAL ($i$) | 1 | 2 | 3 | 4 |
|---|---|---|---|---|
| POLARIZATION DIRECTION ($\phi_i$) | $\phi_1$ | $\phi_2$ | $\phi_3$ | $\phi_4$ |
| LIGHT SOURCE DIRECTION ($s_i$) | $s_1$ | $s_2$ | $s_3$ | $s_4$ |

1

IMAGING DEVICE, INFORMATION PROCESSING DEVICE, IMAGING METHOD, AND INFORMATION PROCESSING METHOD

CROSS REFERENCE TO RELATED APPLICATIONS

This application is a U.S. National Phase of International Patent Application No. PCT/JP2020/045246 filed on Dec. 4, 2020, which claims priority benefit of Japanese Patent Application No. JP 2019-225887 filed in the Japan Patent Office on Dec. 13, 2019. Each of the above-referenced applications is hereby incorporated herein by reference in its entirety.

FIELD

The present disclosure relates to an imaging device, an information processing device, an imaging method, and an information processing method.

BACKGROUND

As one of methods for measuring a three-dimensional shape of a subject, there is photometric stereo. In the photometric stereo, light is sequentially and separately emitted to a subject from a plurality of directions, and a distance to the subject or a three-dimensional shape of the subject is measured from the differences in shading (see, for example, Patent Literature 1).

CITATION LIST

Patent Literature

Patent Literature 1: JP 2017-72499 A

SUMMARY

Technical Problem

However, in the above conventional technology, the subject is sequentially imaged by a camera while switching lights, and thus in a case where the subject is a moving object, a positional shift due to movement of the subject occurs during switching of the lights, and accurate measurement cannot be performed.

Therefore, the present disclosure proposes an imaging device, an information processing device, an imaging method, and an information processing method capable of accurately measuring a three-dimensional shape of a moving object.

Solution to Problem

According to the present disclosure, an imaging device is provided. The imaging device includes an imaging unit, a separating unit, a calculating unit, and an estimation unit. The imaging unit includes a plurality of polarization lights having different polarization directions of light emitted to a subject and a polarization sensor and captures an image of the subject that is simultaneously irradiated with the light from the plurality of polarization lights. The separating unit separates pixel signals corresponding to each of the polarization directions from the image captured by the imaging unit and generates an image for every polarization direction. The calculating unit calculates a normal line on a surface of the subject from the image for each of the polarization directions by photometric stereo. The estimation unit estimates the shape of the subject on the basis of the normal line calculated by the calculating unit.

DESCRIPTION OF EMBODIMENTS

Figure 1:
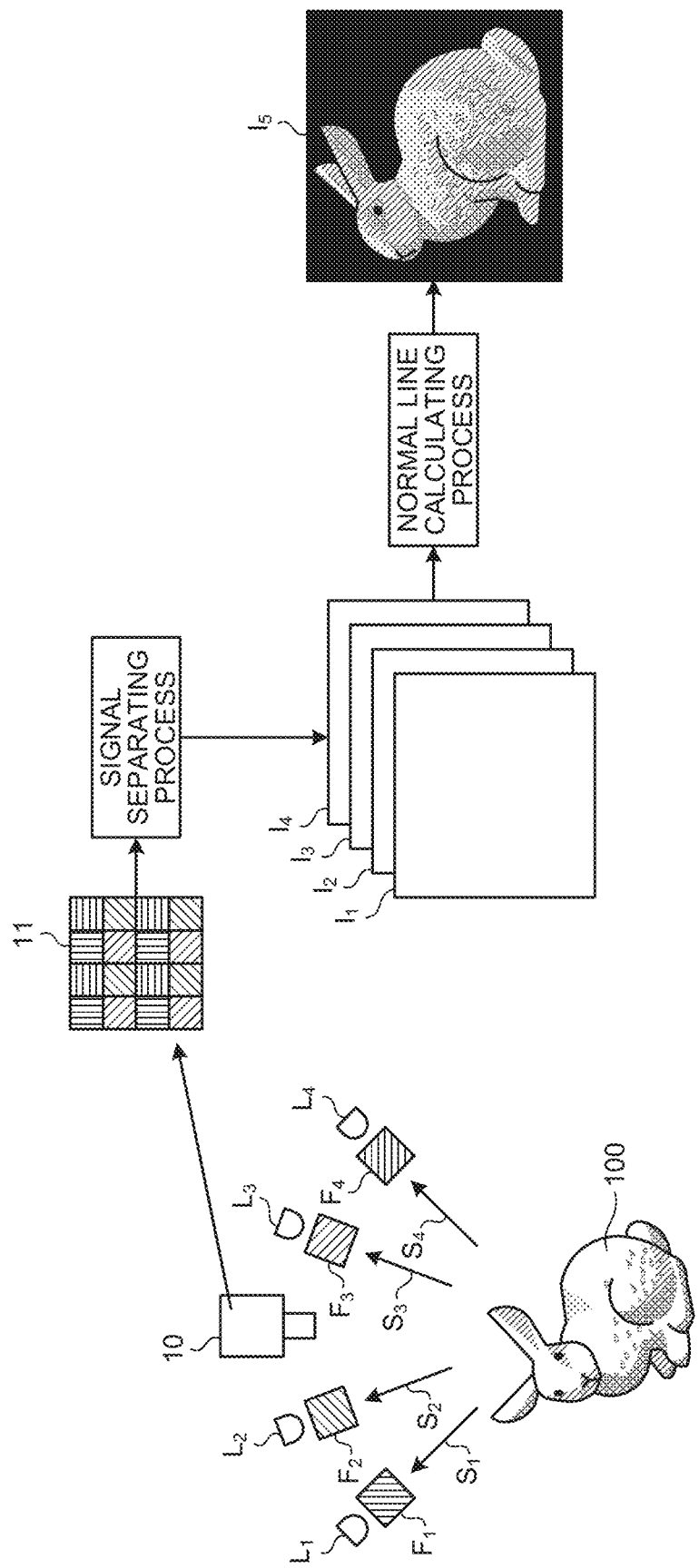
FIG. 1 is an explanatory diagram illustrating an overview of an imaging method and an information processing method according to the present disclosure.

Hereinafter, embodiments of the present disclosure will be described in detail on the basis of the drawings. Note that in each of the following embodiments, the same parts are denoted by the same symbols, and redundant description will be omitted.

[1. Problem Behind Present Disclosure]

In the basic photometric stereo, light is emitted to a subject while sequentially switching a plurality of lights having different light emission directions with respect to the subject, an image of the subject illuminated by each light is captured, and the three-dimensional shape of the subject is measured on the basis of differences in the shade of the subject in the images.

However, in this method, a positional shift due to movement of the subject occurs during switching of the lights, and accurate measurement cannot be performed, and thus it is difficult to apply the method to a subject that is a moving object, and it is only possible to measure an accurate three-dimensional shape of a subject that is a stationary object.

Therefore, there is a measurement method of a wavelength multiplexing system in which lights are multiplexed using a difference in color of light emitted to a subject, and the three-dimensional shape of the subject is measured by one-time imaging without switching the lights. In the wavelength multiplexing system, the three-dimensional shape of the subject is measured by imaging the subject by simultaneously emitting light having different wavelengths (colors) to the subject from a plurality of lights, extracting each color component from the captured image, and obtaining shade to be obtained in a case where the light emission is performed with one of the lights alone.

As described above, in the wavelength multiplexing system, it is not necessary to switch lights, and the three-dimensional shape of a subject can be measured by one-time imaging. Therefore, even in a case where the subject is a moving object, it is possible to measure the three-dimensional shape of the subject.

However, in the wavelength multiplexing system, for example, the color of light to be emitted to the subject is changed by applying different narrowband bandpass filters to lights. Therefore, the amount of light is reduced by transmission through the narrowband bandpass filters, the S/N ratio is deteriorated, which may deteriorate the measurement accuracy.

In addition, in a case where it is difficult to discriminate between the color of a light and the color of the subject, a measurement error may occur. Furthermore, in a case where the number of colors of light to be emitted to a subject is increased, it is necessary to use a narrower bandpass filter or to increase the number of light emitting diodes (LEDs) having different colors to be developed, which increases the cost. Meanwhile, an imaging device, an information processing device, an imaging method, and an information processing method according to the present disclosure accurately measure the three-dimensional shape of a moving object without increasing the cost.

[2. Overview of Imaging Method and Information Processing Method]

First, an overview of an imaging method and an information processing method according to the present disclosure will be described with reference to FIG. 1. FIG. 1 is an explanatory diagram illustrating an overview of an imaging method and an information processing method according to the present disclosure.

The imaging method and the information processing method according to the present disclosure enable measurement of the three-dimensional shape of a moving object by multiplexing lights using polarized light and simultaneously emitting light having different polarization directions from a plurality of directions to a subject at one time of imaging and thereby imaging the subject.

For example, as illustrated in FIG. 1, one camera 10 and a plurality of (here, four) light sources $L_1$, $L_2$, $L_3$, and $L_4$ are prepared. The light sources $L_1$, $L_2$, $L_3$, and $L_4$ are arranged in different directions (hereinafter referred to as light source directions) $S_1$, $S_2$, $S_3$, and $S_4$ with respect to a subject 100. Note that the number of light sources is not limited to four.

Moreover, the light sources $L_1$, $L_2$, $L_3$, and $L_4$ include, at light emission units, polarization filters $F_1$, $F_2$, $F_3$, and $F_4$ having different polarization directions, respectively, and emit light each having different polarization directions to the subject 100. In the light sources $L_1$, $L_2$, $L_3$, and $L_4$, the polarization direction of light to emit and the light source direction (position with respect to the subject) are associated with each other in advance.

The camera 10 includes a polarization sensor 11. In the imaging method and the information processing method according to the present disclosure, each polarization direction component is separated from image data acquired by the polarization sensor 11 by a signal separating process. Then, on the basis of the correspondence relationship between the polarization directions of light and the light source directions associated in advance, images $I_1$, $I_2$, $I_3$, and $I_4$, each of which would be obtained in a case where light is emitted from one of the light sources $L_1$, $L_2$, $L_3$, and $L_4$ in the respective directions, are calculated.

Then, a normal line calculating process is performed on each of the images $I_1$, $I_2$, $I_3$, and $I_4$, thereby calculating a normal line image Is, and a distance estimating process is performed using the normal line image Is, thereby estimating the surface three-dimensional shape of the subject 100. As a result, in the imaging method and the information processing method according to the present disclosure, the three-dimensional shape of the moving object can be accurately measured.

According to this method, in a case where the number of light sources is increased, it is only necessary to change the direction of the polarization filters provided in each of the lights, and thus the cost does not increase, and the amount of light does not decrease since no narrowband bandpass filters are used. Therefore, it is possible to improve the measurement accuracy of a three-dimensional shape.

[3. Configuration of Imaging Device]

Figure 2:
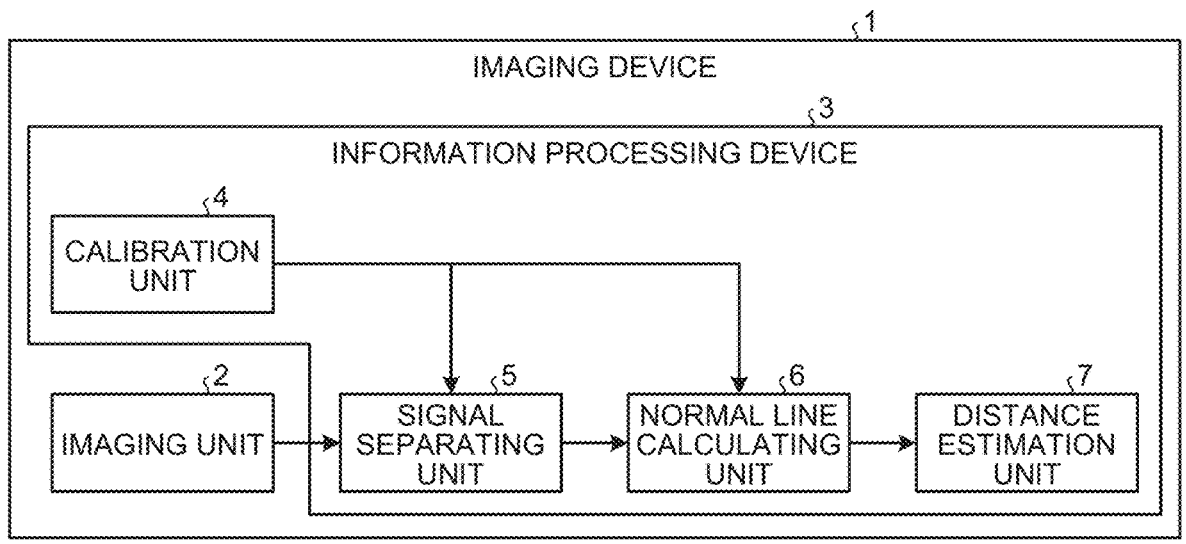
FIG. 2 is a block diagram illustrating an exemplary configuration of an imaging device according to the present disclosure.

Next, the configuration of the imaging device according to the present disclosure will be described with reference to FIG. 2. FIG. 2 is a block diagram illustrating an exemplary configuration of the imaging device according to the present disclosure. As illustrated in FIG. 2, an imaging device 1 according to the present disclosure includes an imaging unit 2 and an information processing device 3.

The imaging unit 2 includes the light sources $L_1$, $L_2$, $L_3$, and $L_4$ including the polarization filters $F_1$, $F_2$, $F_3$, and $F_4$, respectively, and the camera 10 illustrated in FIG. 1. The imaging unit 2 causes the camera 10 to capture an image of the subject 100 in a state in which light having different polarization directions is simultaneously emitted from the light sources $L_1$, $L_2$, $L_3$, and $L_4$ via the polarization filters $F_1$, $F_2$, $F_3$, and $F_4$, respectively, and outputs image data of the captured image to the information processing device 3.

The information processing device 3 includes, for example, a microcomputer including a central processing unit (CPU), a read only memory (ROM), a random access memory (RAM), and the like and various types of circuits.

The information processing device 3 includes a calibration unit 4 that functions when the CPU executes an information processing program stored in the ROM using the RAM as a work area, a signal separating unit 5, a normal line calculating unit 6, and a distance estimation unit 7.

Note that, some or all of the calibration unit 4, the signal separating unit 5, the normal line calculating unit 6, and the distance estimation unit 7 included in the information processing device 3 may be configured by hardware such as an application specific integrated circuit (ASIC) or a field programmable gate array (FPGA). Furthermore, the signal separating unit 5, the normal line calculating unit 6, and the distance estimation unit 7 are not necessarily included in the information processing device 3 and may be provided on a cloud, for example.

The calibration unit 4, the signal separating unit 5, the normal line calculating unit 6, and the distance estimation unit 7 included in the information processing device 3 each implement or execute an action of information processing described below. Note that the internal configuration of the information processing device 3 is not limited to the configuration illustrated in FIG. 2 and may be another configuration as long as the information processing described below is performed.

[4.1. Calibration Unit]

The calibration unit 4 includes a storage unit and stores information regarding linearization of the output luminance of the camera 10, information of shading data generated in a case where light is emitted by each of the light sources, information in which the light source directions and the polarization directions are associated with each other, and other information.

[4.1.1. Linearization of Output Luminance of Camera]

Figure 3:
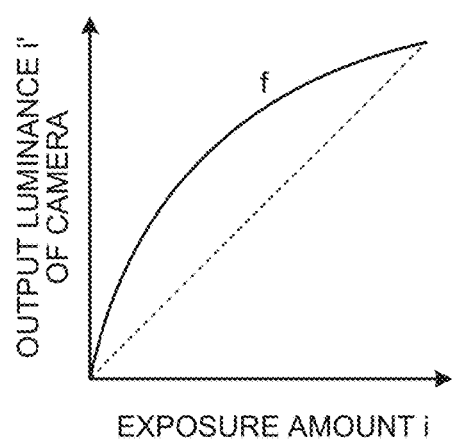
FIG. 3 is an explanatory diagram illustrating a relationship between an exposure amount and output luminance of a camera according to the present disclosure.

FIG. 3 is an explanatory diagram illustrating a relationship between the exposure amount and the output luminance of the camera according to the present disclosure. As illustrated in FIG. 3, in the camera 10, the output luminance i' in a captured image increases as the exposure amount i increases. However, as indicated by a solid line in FIG. 3, the changes in the output luminance i' of the camera 10 accompanying the changes in the exposure amount i is not linear.

Therefore, the calibration unit 4 measures the luminance of images sequentially captured while changing the exposure amount i of the camera 10, calculates a characteristic function indicating the relationship between the exposure amount i and the output luminance i' of the camera 10 indicated by the solid line in FIG. 3, and stores an inverse transform function of the characteristic function. The inverse transform function is used when a preprocessing unit 51 (see FIG. 13) to be described later included in the signal separating unit 5 linearizes an image signal. As a result, the characteristic of the output luminance i' of the camera 10 is corrected to be linear as indicated by a dotted line in FIG. 3.

[4.1.2. Storing of Shading Data]

The calibration unit 4 also acquires and stores shading data indicating the state of shade made when light is emitted by each of the light sources $L_1$, $L_2$, $L_3$, and $L_4$.

Figure 4:
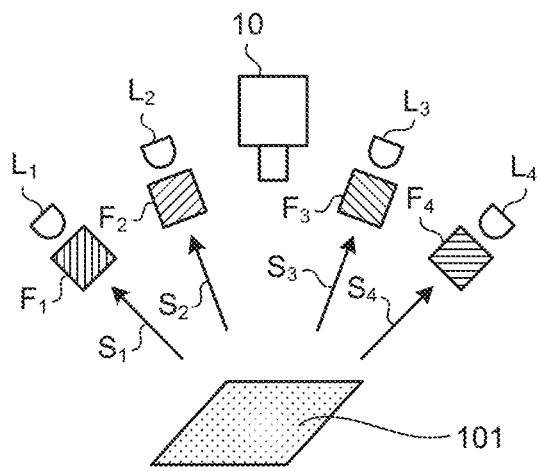
FIG. 4 is an explanatory diagram of an acquisition method of shading data according to the present disclosure.
Figure 5:
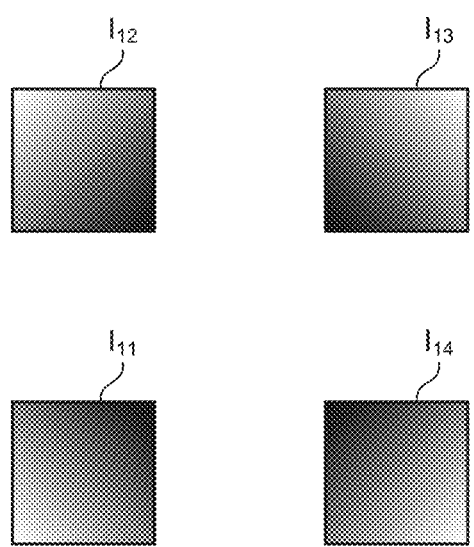
FIG. 5 is an explanatory diagram of the acquisition method of shading data according to the present disclosure.

FIGS. 4 and 5 are explanatory diagrams of an acquisition method of shading data according to the present disclosure. As illustrated in FIG. 4, in a case where shading data is acquired, for example, a gray plate 101 is disposed at a place where the subject 100 (see FIG. 1) is placed. Then, the gray plate 101 is sequentially irradiated with light by each of the light sources $L_1$, $L_2$, $L_3$, and $L_4$, and images of the gray plate 101 are captured by the camera 10.

At this point, the positions of the light sources $L_1$, $L_2$, $L_3$, and $L_4$ with respect to the gray plate 101 are different from each other. Therefore, as illustrated in FIG. 4, for example, while the light source $L_1$ is turned on, an image $I_{11}$ in which the shade becomes darker from the lower left toward the upper right of the image is captured, and while the light source $L_2$ is turned on, an image $I_{12}$ in which the shade becomes darker from the upper left toward the lower right of the image is captured.

Likewise, while the light source $L_3$ is turned on, an image $I_{13}$ in which the shade becomes darker from the upper right toward the lower left of the image is captured, and while the light source $L_4$ is turned on, an image $I_{14}$ in which the shade becomes darker from the lower right toward the upper left of the image is captured. The calibration unit 4 acquires and stores image data of these images $I_{11}$, $I_{12}$, $I_{13}$, and $I_{14}$ as shading data.

[4.1.3. Detection of Light Source Direction]

Figure 6:
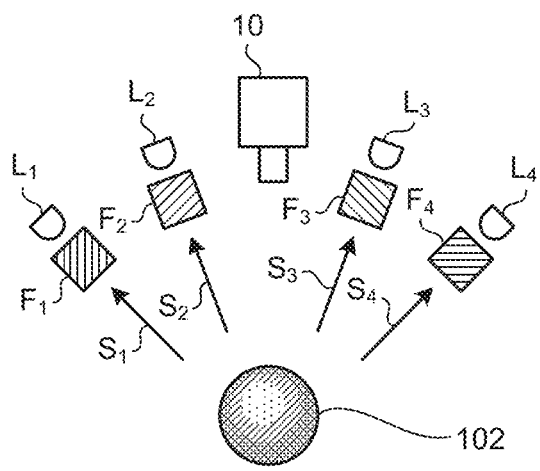
FIG. 6 is an explanatory diagram of a detection method of a light source direction according to the present disclosure.
Figure 7:
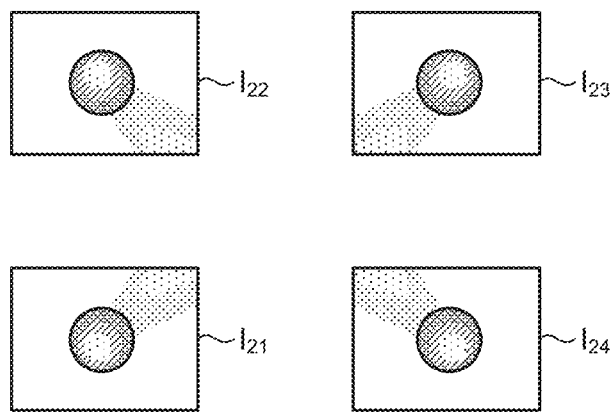
FIG. 7 is an explanatory diagram of the detection method of a light source direction according to the present disclosure.
Figures 8, 9:
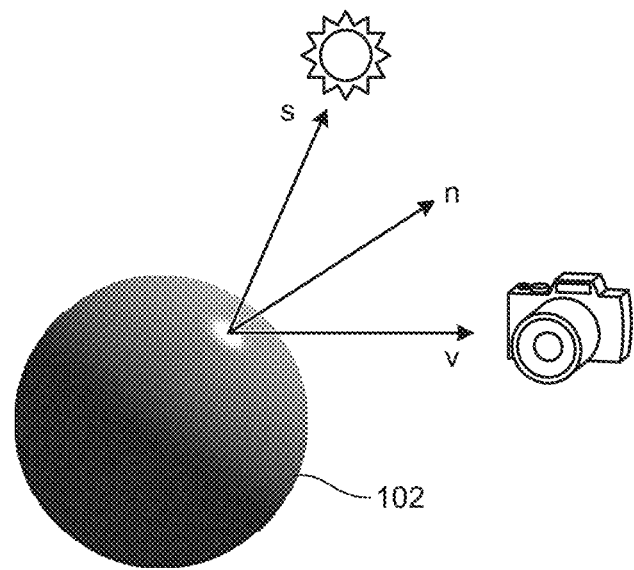
FIG. 8 is an explanatory diagram of the detection method of a light source direction according to the present disclosure.
FIG. 9 is an explanatory table illustrating an example of a light source direction and polarization direction correspondence table according to the present disclosure.

The calibration unit 4 also detects each of the light source directions. FIGS. 6 to 8 are explanatory diagrams of a detection method of a light source direction according to the present disclosure. As illustrated in FIG. 6, in a case where a light source direction is detected, for example, a spherical object 102, surface of which is mirror-finished and the shape of which is known, is disposed at a place where the subject 100 (see FIG. 1) is placed. Then, the spherical object 102 is sequentially irradiated with light by each of the light sources $L_1$, $L_2$, $L_3$, and $L_4$, and images of the spherical object 102 are captured by the camera 10.

At this point, the positions of the light sources $L_1$, $L_2$, $L_3$, and $L_4$ with respect to the spherical object 102 are different from each other. Therefore, as illustrated in FIG. 7, for example, while the light source $L_1$ is turned on, an image $I_{21}$ in which a position on the lower left of the spherical object 102 appears as a highlight portion with a high luminance is captured, and while the light source $L_2$ is turned on, an image $I_{22}$ in which a position on the upper left of the spherical object 102 appears as a highlight portion is captured.

In addition, while the light source $L_3$ is turned on, an image $I_{23}$ in which a position on the upper right of the spherical object 102 appears as a highlight portion is captured, and while the light source $L_4$ is turned on, an image $I_{24}$ in which a position on the lower right of the spherical object 102 appears as a highlight portion is captured.

At this point, as illustrated in FIG. 8, a normal line direction n at the center of a highlight portion is obtained as a half vector of a line-of-sight direction (imaging direction of the camera 10) V and a light source direction S. Therefore, the calibration unit 4 can calculate the light source direction of each of the light sources $L_1$, $L_2$, $L_3$, and $L_4$ by the following Equation (1).

$$s = \frac{v - n}{|v - n|} \tag{1}$$

[4.1.4. Association Between Light Source Direction and Polarization Direction]

In addition, the calibration unit 4 associates the light source direction of each of the light sources $L_1$, $L_2$, $L_3$, and $L_4$ with a polarization direction of emitted light.

When a light source direction and a polarization direction are associated with each other, the gray plate 101 (see FIG. 4) is imaged by the camera 10 as in the case of acquiring shading data. The calibration unit 4 performs linearization and shading correction of the captured image data, estimates a polarization model to be described later and thereby obtains a polarization angle $\phi_i$, sets the polarization angle $\phi_i$ as the polarization direction of a polarization light i, associates the polarization angle $\phi_i$ with the light source direction that has been detected earlier and stores as a light source direction and polarization direction correspondence table.

FIG. 9 is an explanatory table illustrating an example of a light source direction and polarization direction correspondence table according to the present disclosure. In the example illustrated in FIG. 9, to the light source $L_1$ having 1 as the light source number (i), $\phi_1$ is associated as the polarization direction ($\phi_i$), and $S_1$ is associated as the light source direction ($S_i$). To the light source $L_2$ having 2 as the light source number (i), $\phi_2$ is associated as the polarization direction ($\phi_i$), and $S_2$ is associated as the light source direction ($S_i$).

Moreover, to the light source $L_3$ having 3 as the light source number (i), $\phi_3$ is associated as the polarization direction ($\phi_i$), and $S_3$ is associated as the light source direction ($S_i$). To the light source $L_4$ having 4 as the light source number (i), $\phi_4$ is associated as the polarization direction ($\phi_i$), and $S_4$ is associated as the light source direction ($S_i$).

[4.1.5. Configuration of Imaging Unit]

Figure 10:
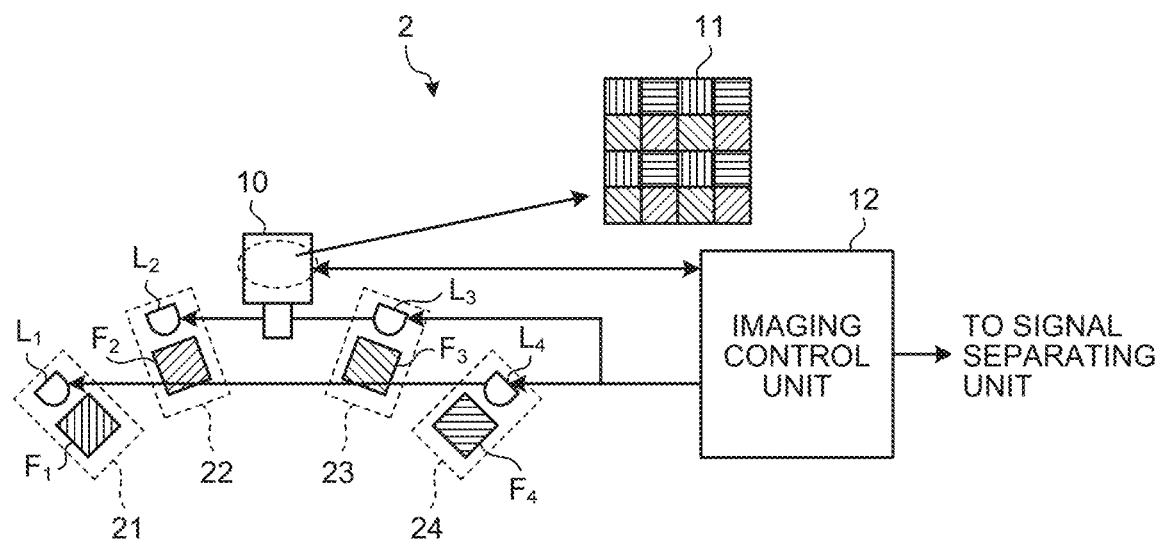
FIG. 10 is an explanatory diagram of an imaging unit according to the present disclosure.
Figure 11:
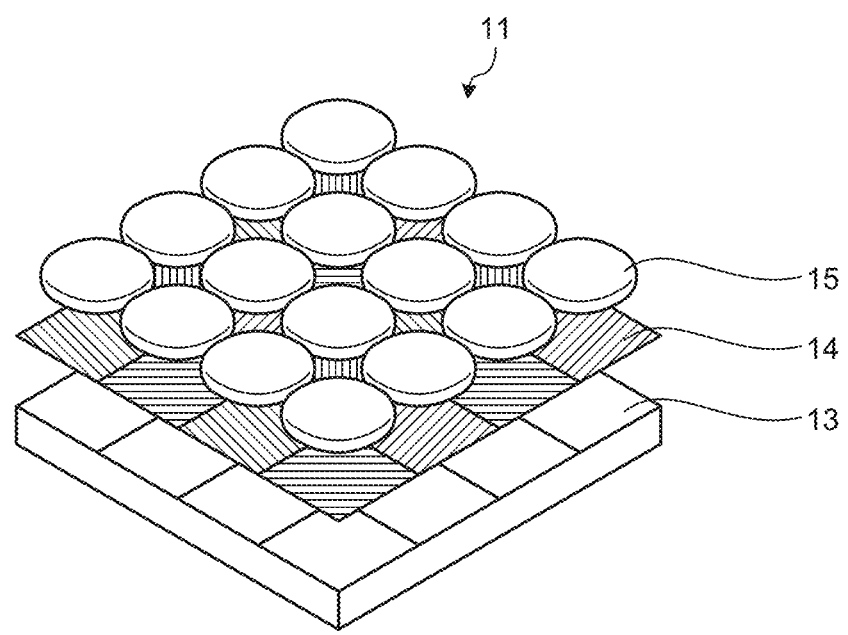
FIG. 11 is an explanatory diagram of an imaging unit according to the present disclosure.
Figure 12:
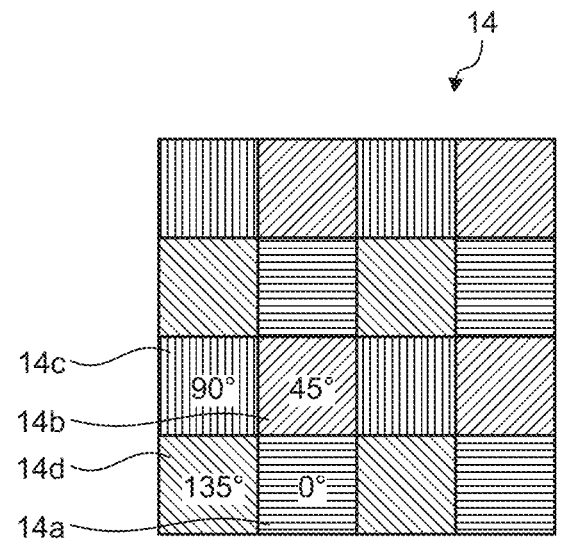
FIG. 12 is an explanatory diagram of an imaging unit according to the present disclosure.

Here, before describing the signal separating unit 5, the configuration of the imaging unit 2 will be described with reference to FIGS. 10 to 12. FIGS. 10 to 12 are explanatory diagrams of the imaging unit according to the present disclosure. As illustrated in FIG. 10, the imaging unit 2 includes a plurality of polarization lights 21, 22, 23, and 24, the camera 10, and an imaging control unit 12.

Each of the polarization lights 21, 22, 23, and 24 includes light sources $L_1$, $L_2$, $L_3$, and $L_4$ that are white LEDs and polarization filters $F_1$, $F_2$, $F_3$, and $F_4$ having different polarization directions, respectively. The polarization filters $F_1$, $F_2$, $F_3$, and $F_4$, for example, selectively transmit light having polarization directions of 0°, 45°, 90°, and 135°, respectively.

The camera 10 includes a polarization sensor 11. As illustrated in FIG. 11, the polarization sensor 11 includes a pixel array 13 in which a plurality of imaging elements is arranged in a matrix shape, a polarization filter 14 that selectively causes light having different polarization directions associated with the respective imaging elements to enter the imaging elements, and microlenses 15 provided to every imaging element.

In the polarization filter 14, as illustrated in FIG. 12, regions 14a, 14b, 14c, and 14d in which wire grids in four directions (0°, 45°, 90°, and 135°) are arrayed at positions facing the respective imaging elements in an arrangement similar to the Bayer array, for example.

Referring back to FIG. 10, the imaging control unit 12 simultaneously turns on all of the plurality of polarization lights 21, 22, 23, and 24, then causes the camera 10 to image the subject 100 (see FIG. 1), and then turns off the polarization lights 21, 22, 23, and 24.

Furthermore, in a case where moving image is captured, the imaging control unit 12 causes the camera 10 to repeatedly perform imaging while all of the plurality of polarization lights 21, 22, 23, and 24 are simultaneously turned on and continues imaging until there is an instruction to stop the imaging from a user. The imaging control unit 12 turns off the polarization lights 21, 22, 23, and 24 after the moving image has been capturing. The imaging control unit 12 acquires image data of the image that has been captured from the camera 10 and outputs the image data to the signal separating unit 5 in the subsequent stage.

[4.1.6. Signal Separating Unit]

Figure 13:
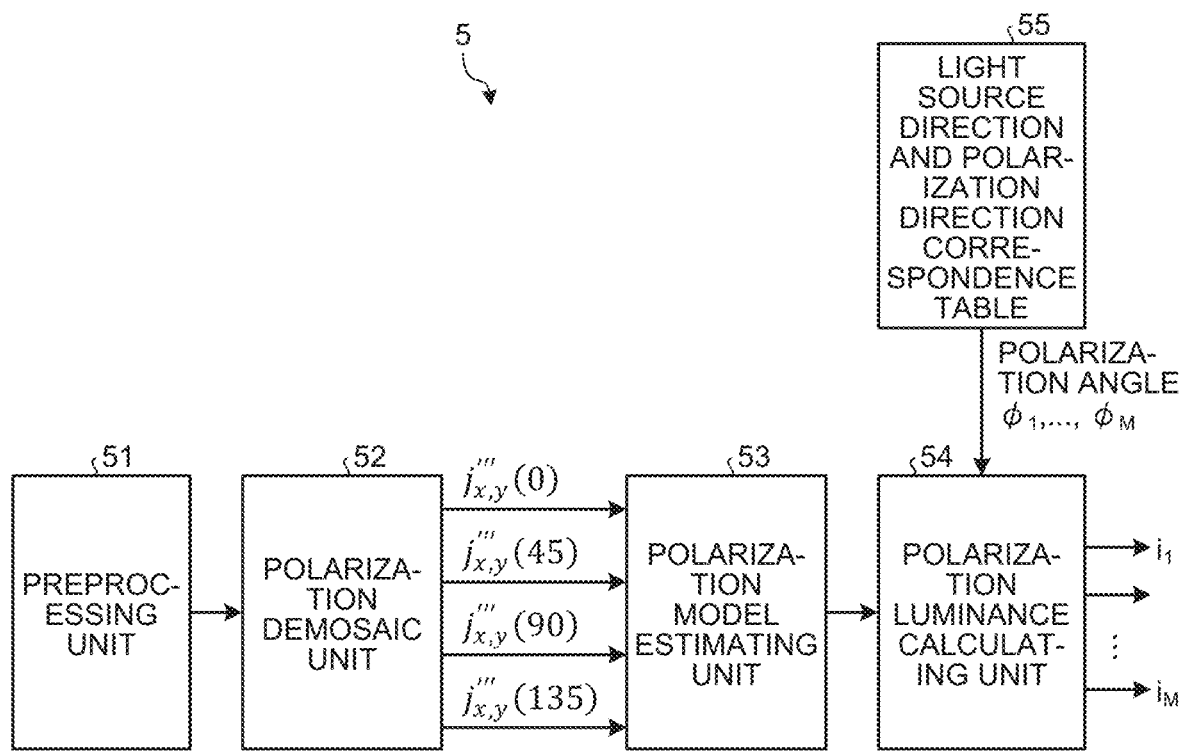
FIG. 13 is a block diagram illustrating an exemplary configuration of a signal separating unit according to the present disclosure.

Next, the signal separating unit will be described with reference to FIG. 13. FIG. 13 is a block diagram illustrating an exemplary configuration of the signal separating unit according to the present disclosure. As illustrated in FIG. 13, the signal separating unit 5 according to the present disclosure includes a preprocessing unit 51, a polarization demosaic unit 52, a polarization model estimating unit 53, and a polarization luminance calculating unit 54.

The preprocessing unit 51 performs linearization of the output luminance i' of the camera 10 in the image data input from the camera 10 and shading correction. The preprocessing unit 51 performs linearization of the output luminance i' using the following Equation (2).

$$j'_{x,y} = f^{-1}(j_{x,y}) \quad (2)$$

As expressed in Equation (2), the preprocessing unit 51 calculates linearized output luminance $j'_{x,y}$ by applying an inverse transform function of a characteristic function of the camera 10 to output luminance $j_{x,y}$ of each pixel.

In addition, the preprocessing unit 51 performs shading correction using the following Equation (3).

$$j''_{x,y} = j'_{x,y}/(l_1 l_2 \ldots l_M) \quad (3)$$

As expressed in Equation (3), the preprocessing unit 51 calculates output luminance $j''_{x,y}$ obtained by performing shading correction by dividing each linearized output luminance $j'_{x,y}$ by the luminance $l_1 l_2, \ldots, l_M$ of corresponding pixels in the images $I_{11}$, $I_{12}$, $I_{13}$, and $I_{14}$ illustrated in FIG. 5.

The polarization demosaic unit 52 obtains, from the data in the directions of 0°, 45°, 90°, and 135° assigned to each pixel, data in these four directions for each pixel ($j'''_{x,y}(0)$, $j'''_{x,y}(45)$, $j'''_{x,y}(90)$, $j'''_{x,y}(135)$).

Figure 14:
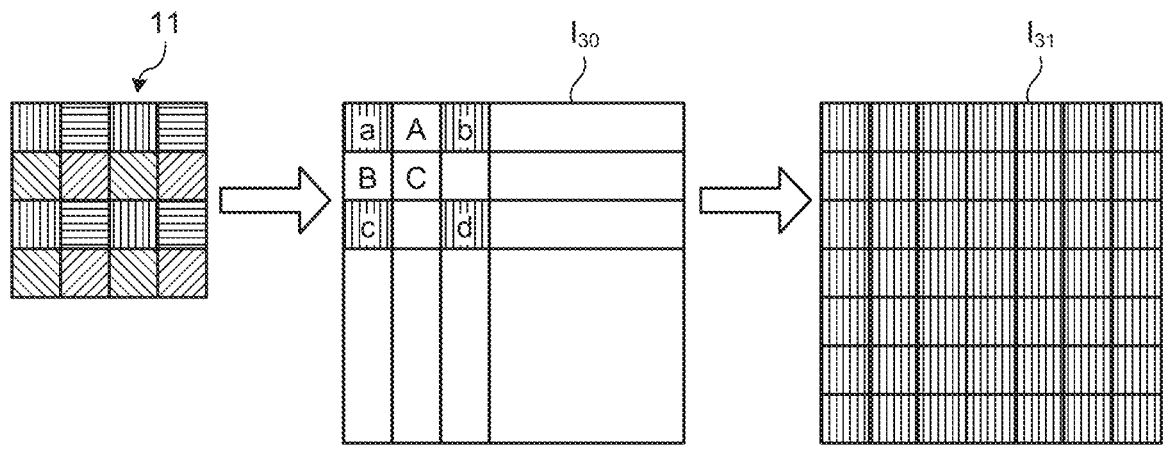
FIG. 14 is an explanatory diagram of a polarization demosaic process according to the present disclosure.

FIG. 14 is an explanatory diagram of a polarization demosaic process according to the present disclosure. For example, as illustrated in FIG. 14, in a case where data of the polarization direction of 90° in an image $I_{30}$ captured by the polarization sensor 11 is obtained, the following Equations (4) are used.

$$\left. \begin{array}{l} A = \dfrac{a+b}{2} \\ B = \dfrac{a+c}{2} \\ C = \dfrac{a+b+c+d}{4} \end{array} \right\} \quad (4)$$

As expressed by Equation (4), the polarization demosaic unit 52 calculates and complements the data of A, B, and C using data a, b, c, and d of imaging elements where a wire grid of 90° (see FIG. 12) is included and thereby calculates data of an image $I_{31}$ having been subjected to the polarization demosaic process.

The polarization demosaic unit 52 calculates data for every pixel by a similar method also for data in the polarization directions of 0°, 45°, and 135°. Referring back to FIG. 13, the polarization demosaic unit 52 outputs the calculated data ($j'''_{x,y}(0)$, $j'''_{x,y}(45)$, $j'''_{x,y}(90)$, $j'''_{x,y}(135)$) to the polarization model estimating unit 53.

Figure 15:
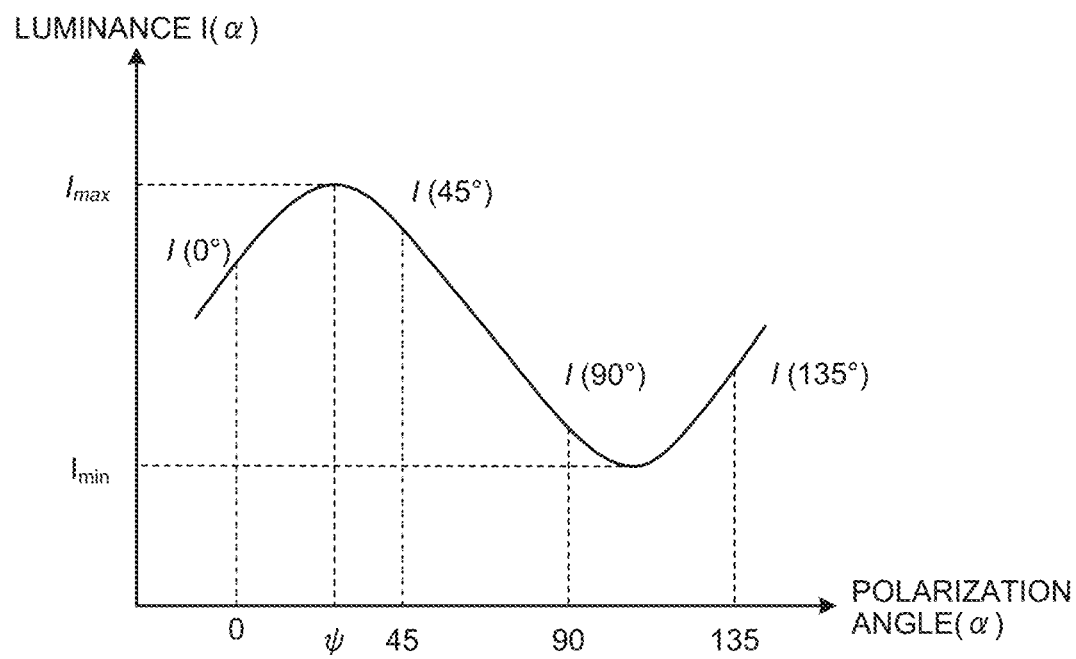
FIG. 15 is an explanatory graph illustrating an example of a polarization model according to the present disclosure.

The polarization model estimating unit 53 estimates a polarization model indicating a correspondence relationship between the polarization angle and the luminance. FIG. 15 is an explanatory graph illustrating an example of a polarization model according to the present disclosure. The polarization model estimating unit 53 estimates the polarization model illustrated in FIG. 15 using the polarization sensor data ($j'''_{x,y}(0)$, $j'''_{x,y}(45)$, $j'''_{x,y}(90)$, $j'''_{x,y}(135)$) obtained for each pixel. The signal separating unit 5 can estimate luminance $I(\alpha)$ for any polarization angle (a) by using such a polarization model.

The polarization model illustrated in FIG. 15 is expressed by a formula as the following Equation (5).

$$I(\alpha) = \frac{I_{max} + I_{min}}{2} + \frac{I_{max} - I_{min}}{2} \cos(2\alpha - 2\psi) \qquad (5)$$
$$= \frac{I_{max} + I_{min}}{2} + \frac{I_{max} - I_{min}}{2} \cos(\cos 2\alpha \cos 2\psi + \sin 2\alpha \sin 2\psi)$$

The polarization model estimating unit 53 obtains $I_{max}$, $I_{min}$, and $\psi$, which are unknown parameters in the above Equation (5), from $I(\alpha_1), \ldots, I(\alpha_m)$, which are imaging data.

The above Equation (5) is expressed by a matrix as the following Equation (6).

$$\underbrace{\begin{bmatrix} 1 & \cos 2 \cdot 0° & \sin 2 \cdot 0° \\ 1 & \cos 2 \cdot 45° & \sin 2 \cdot 45° \\ 1 & \cos 2 \cdot 90° & \sin 2 \cdot 90° \\ 1 & \cos 2 \cdot 135° & \sin 2 \cdot 135° \end{bmatrix}}_{\text{KNOWN MATRIX}} \underbrace{\begin{bmatrix} \frac{I_{max} + I_{min}}{2} \\ \frac{I_{max} - I_{min}}{2} \cos 2\psi \\ \frac{I_{max} - I_{min}}{2} \sin 2\psi \end{bmatrix}}_{\text{UNKNOWN PARAMETER}} = \underbrace{\begin{bmatrix} I(0°) \\ I(45°) \\ I(90°) \\ I(135°) \end{bmatrix}}_{\text{IMAGING DATA}} \qquad (6)$$

Furthermore, let the known matrix in Equation (6) be A, the unknown parameter be x, and the imaging data be b, Equation (6) is obtained as the following Equations (7).

$$Ax = b, \quad x = \begin{bmatrix} x_1 \\ x_2 \\ x_3 \end{bmatrix} \qquad (7)$$

Then, Equations (7) are transformed using an inverse matrix $A^{-1}$ of the known matrix A, and the following (8) is obtained.

$$x = A^{-1} b \qquad (8)$$

As a result, the polarization model estimating unit 53 can obtain the unknown parameters $I_{max}$, $I_{min}$, and $\psi$ by the following Equations (9).

[Equation 9]

$$\left. \begin{array}{l} I_{max} = x_1 + \sqrt{x_2^2 + x_3^2} \\ I_{min} = x_1 - \sqrt{x_2^2 + x_3^2} \\ \psi = \frac{1}{2} \tan^{-1} \frac{x_3}{x_2} \end{array} \right\} \qquad (9)$$

Using the unknown parameters $I_{max}$, $I_{min}$, $\psi$, and Equation (5) obtained by the polarization model estimating unit 53, the polarization luminance calculating unit 54 obtains, for every pixel, image luminance (i=I($\phi_1$) to ($\phi_4$)) in a case where light is emitted in a polarization direction corresponding to each of the light sources $L_1$, $L_2$, $L_3$, and $L_4$. At this point, the polarization luminance calculating unit 54 uses the angle of the polarization direction in the light source direction and polarization direction correspondence table 55.

[5. Normal Line Calculating Unit]

Figure 16:
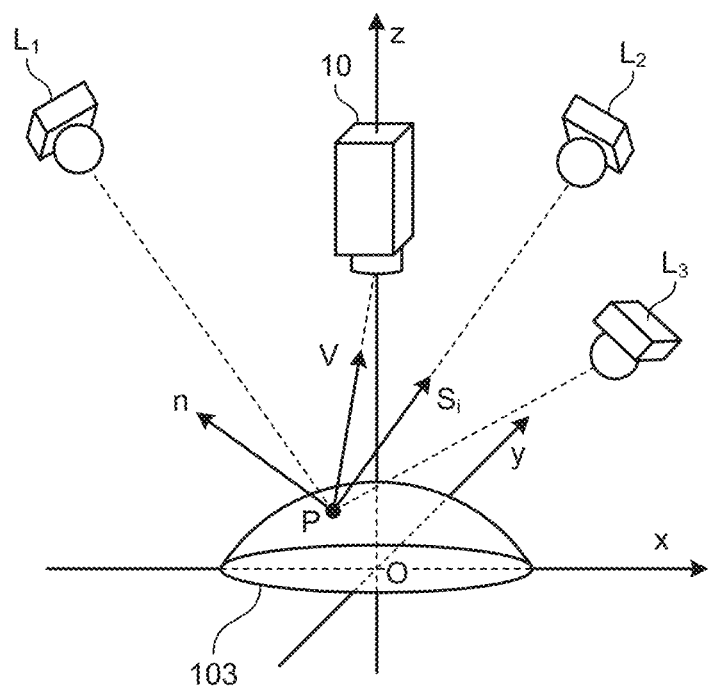
FIG. 16 is an explanatory diagram of a normal line calculation method according to the present disclosure.

Next, a normal line calculation method by the normal line calculating unit 6 will be described with reference to FIG. 16. FIG. 16 is an explanatory diagram of the normal line calculation method according to the present disclosure.

As illustrated in FIG. 16, for example, in a case where there are three light sources $L_1$, $L_2$, and $L_3$, the normal line calculating unit 6 calculates a normal vector n for every pixel by calculating the following Equations (10) and (12) using a light source vector $S_i$ corresponding to the light source direction in the light source direction and polarization direction correspondence table 55 and the luminance i of each pixel input from the polarization luminance calculating unit 54.

Furthermore, in a case where there are M light sources $L_1, \ldots, L_M$, the normal line calculating unit 6 calculates the normal vector n for every pixel by performing calculations of the following Equations (11) and (12).

$$\underbrace{\begin{bmatrix} i_1 \\ i_2 \\ i_3 \end{bmatrix}}_{i \in \mathbb{R}^{3 \times 1}} = \underbrace{\begin{bmatrix} s_1^\top \\ s_2^\top \\ s_3^\top \end{bmatrix}}_{S \in \mathbb{R}^{3 \times 3}} \underbrace{\rho n}_{\tilde{n} \in \mathbb{R}^{3 \times 1}} \rightarrow i = S\tilde{n} \qquad (10)$$

$$\tilde{n} = S^{-1} i$$

$$\underbrace{\begin{bmatrix} i_1 \\ \vdots \\ i_M \end{bmatrix}}_{i \in \mathbb{R}^{M \times 1}} = \underbrace{\begin{bmatrix} s_1^\top \\ \vdots \\ s_M^\top \end{bmatrix}}_{S \in \mathbb{R}^{M \times 3}} \underbrace{\rho n}_{\tilde{n} \in \mathbb{R}^{3 \times 1}} \qquad (11)$$

$$\tilde{n} = (S^\top S)^{-1} S^\top i = S^\dagger i$$

$$\left. \begin{array}{l} \rho = \|\tilde{n}\| \\ n = \tilde{n} / \|\tilde{n}\| = \tilde{n}/\rho \end{array} \right\} \qquad (12)$$

Note that, in the present embodiment, since the four light sources $L_1$, $L_2$, $L_3$, and $L_4$ are used, M in Equation (11) is 4.

[6. Distance Estimation Unit]

Next, the distance estimation unit 7 will be described. The distance estimation unit 7 calculates a distance Z from a certain reference point to a corresponding point on the subject for each pixel by using normal line information obtained for each pixel. The distance estimation unit 7 calculates the distance Z using, for example, Frankot-Chellappa Algorithm expressed by the following Equation (13) using a Fourier basis.

$$Z = F^{-1}\left( -j \frac{\xi_x F(p) + \xi_y F(q)}{\xi_x^2 + \xi_y^2} \right). \qquad (13)$$

Variables p and q in the above Equation (13) are the x component and the y component, respectively, of the normal vector n calculated by the normal line calculating unit 6. In addition, F denotes a Fourier transform, $\xi_x$ denotes a spatial frequency (x), and $\xi_x$ is a spatial frequency (y).

The distance estimation unit 7 sets a certain reference point in advance, integrates the gradient field from the reference point, and estimates the shape (distance Z) of the subject. At this point, the distance estimation unit 7 calculates the distance Z so that the differentiation between the gradient field and the shape matches.

[7. Processes Executed by Imaging Device]

Figure 17:
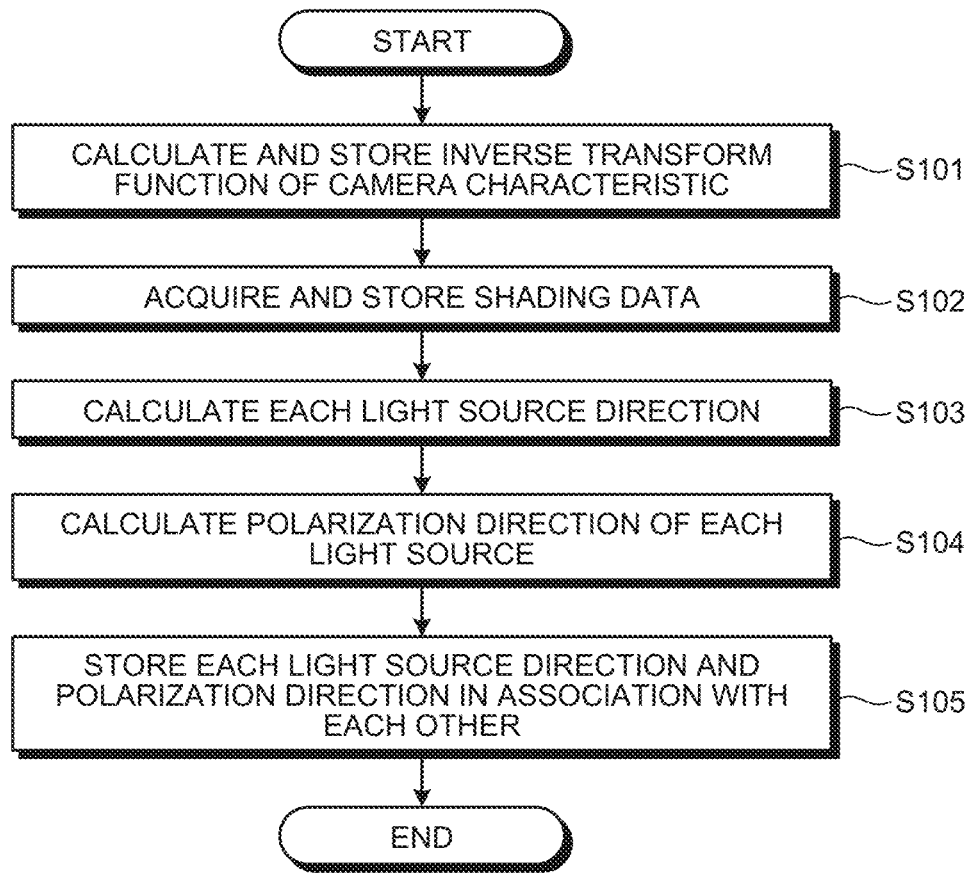
FIG. 17 is a flowchart illustrating processes executed by the imaging device according to the present disclosure.
Figure 18:
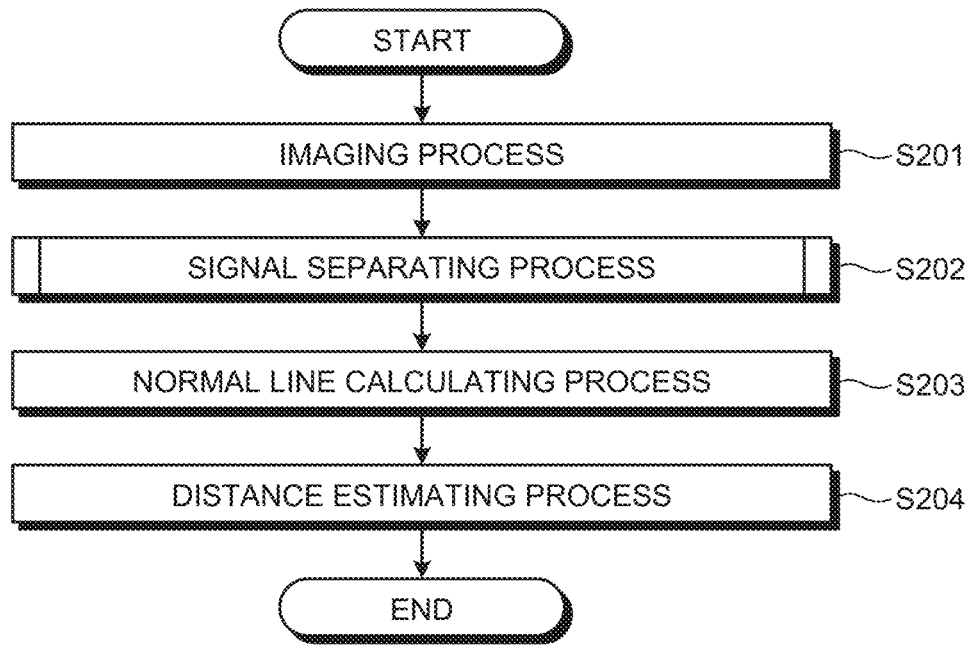
FIG. 18 is a flowchart illustrating processes executed by the imaging device according to the present disclosure.
Figure 19:
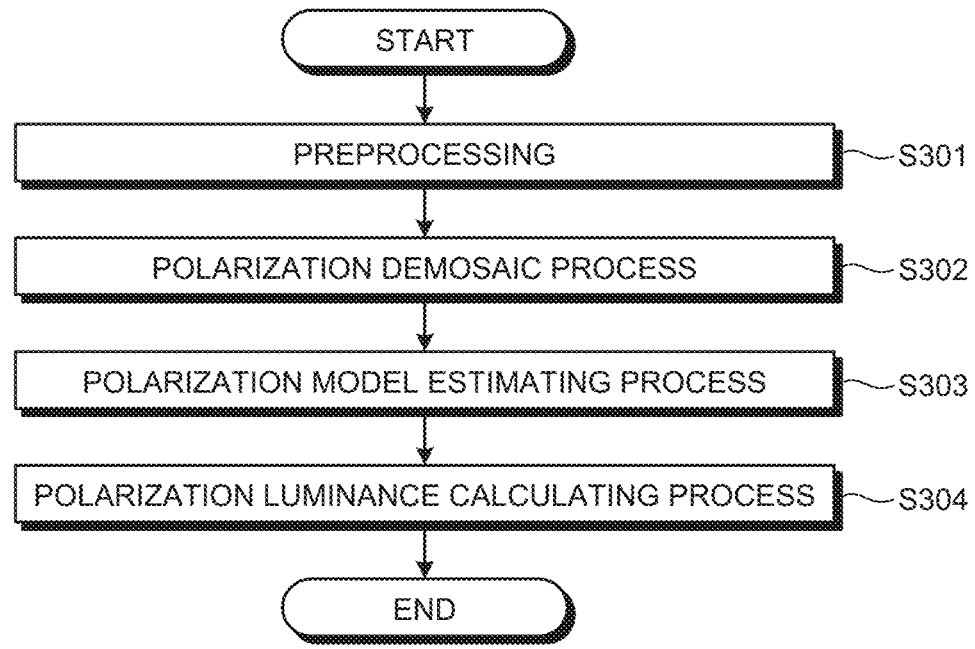
FIG. 19 is a flowchart illustrating processes executed by the imaging device according to the present disclosure.

Next, an example of processes executed by the imaging device according to the present disclosure will be described with reference to FIGS. 17 to 19. FIGS. 17 to 19 are flowcharts illustrating processes executed by the imaging device according to the present disclosure.

Note that illustrated in FIG. 17 is an example of a calibration process executed by the calibration unit 4. Illustrated in FIG. 18 is an example of a three-dimensional shape measuring process performed by the imaging device. Illustrated in FIG. 19 is an example of a signal separating process in the three-dimensional shape measuring process.

In a case of performing the calibration process, as illustrated in FIG. 17, the calibration unit 4 first calculates and stores an inverse transform function of the camera characteristics (characteristic function indicating the relationship between the exposure amount and the output luminance of the camera 10 illustrated in FIG. 3) (Step S101). Subsequently, the calibration unit 4 acquires and stores shading data (see FIG. 5) (Step S102).

Then, the calibration unit 4 calculates the light source direction of each of the light sources (light sources $L_1$ f $L_2$, $L_3$, and $L_4$) (Step S103) and calculates the polarization direction of each of the light sources (light sources $L_1$, $L_2$, $L_3$, and $L_4$) (Step S104). Then, the calibration unit 4 stores each of the light source directions and the polarization direction in association with each other as the light source direction and polarization direction correspondence table 55 (Step S105) and ends the calibration process.

In a case where the three-dimensional shape measuring process is performed, as illustrated in FIG. 18, first, the imaging unit 2 performs an imaging process (Step S201). In the imaging process, the imaging unit 2 simultaneously irradiates a three-dimensional measurement target with light having different polarization directions from a plurality of directions and captures an image of the measurement target by the polarization sensor 11. Subsequently, the signal separating unit 5 performs the signal separating process of separating image signals corresponding to each of the polarization directions from the image captured by the imaging unit 2 (Step S202).

Hereinafter, the signal separating process will be described with reference to FIG. 19. In the signal separating process, as illustrated in FIG. 19, the signal separating unit 5 first performs preprocessing (Step S301). In the preprocessing, the signal separating unit 5 linearizes the output luminance of the camera 10 in the captured image using the inverse transform function of the camera characteristic and performs shading correction of the captured image using the shading data.

Subsequently, the signal separating unit 5 performs polarization demosaic process (Step S302). In the polarization demosaic process, the signal separating unit 5 generates image data for every polarization direction by complementing the captured image, which has been subjected to the shading correction, by performing the demosaic process (see FIG. 14).

Thereafter, the signal separating unit 5 performs a polarization model estimating process (Step S303). In the polarization model estimating process, the signal separating unit 5 estimates a polarization model by calculating unknown parameters ($I_{max}$, $I_{min}$, and $\psi$) in the polarization model (Equation (5)) from the image data (luminance for every pixel) for every polarization direction.

Subsequently, the signal separating unit 5 performs a polarization luminance calculating process (Step S304). In the polarization luminance calculating process, the signal separating unit 5 calculates the luminance of each pixel in the image for every light source direction on the basis of the polarization directions corresponding to the light source directions included in the light source direction and polarization direction correspondence table 55 and the polarization model and outputs the luminance to the normal line calculating unit 6.

Referring back to FIG. 18, when the signal separating process is finished, the normal line calculating unit 6 performs a normal line calculating process (Step S203). In the normal line calculating process, the normal line calculating unit 6 calculates a normal vector on the surface of the measurement target for every pixel on the basis of the luminance of each pixel in the image for every light source direction calculated by the signal separating process and the known light source direction.

Subsequently, the distance estimation unit 7 performs a distance estimating process (Step S204). In the distance estimating process, the distance estimation unit 7 measures the three-dimensional shape of the measurement target by calculating the distance from a predetermined reference point to a point on the measurement target for every pixel using the normal vector for every pixel calculated in the normal line calculating process.

[8. Modification of Camera]

Figure 20:
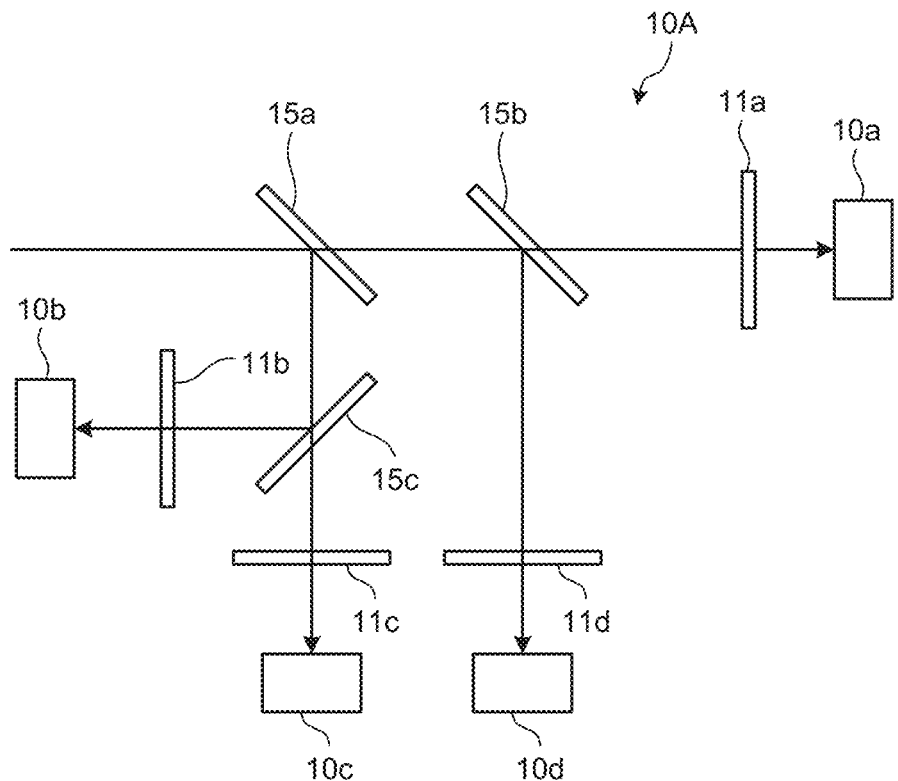
FIG. 20 is an explanatory diagram illustrating a modification of the camera according to the present disclosure.

Next, a modification of the camera 10 will be described with reference to FIG. 20. FIG. 20 is an explanatory diagram illustrating a modification of the camera according to the present disclosure. The camera according to the modification includes a polarization sensor 10A illustrated in FIG. 20.

The polarization sensor 10A includes beam splitters 15a, 15b, 15c, and 15d, image sensors 10a, 10b, 10c, and 10d, and polarization filters 11a, 11b, 11c, and 11d.

The beam splitters 15a, 15b, 15c, and 15d divide incident light into a plurality of light beams. The image sensors 10a, 10b, 10c, and 10d receive respective light beams. The polarization filters 11a, 11b, 11c, and 11d are arranged between the image sensors 10a, 10b, 10c, and 10d and the beam splitters 15a, 15b, 15c, and 15d and have different polarization directions for each of the image sensors 10a, 10b, 10c, and 10d.

The polarization filter 11a selectively transmits, for example, light having a polarization angle of 0°. The polarization filter lib selectively transmits, for example, light having a polarization angle of 45°. The polarization filter 11c selectively transmits, for example, light having a polarization angle of 90°. The polarization filter 11d selectively transmits, for example, light having a polarization angle of 135°.

As a result, the image sensor 10a can capture an image of a subject to which only the light having the polarization angle of 0° is emitted. The image sensor 10b can capture an image of the subject to which only the light having the polarization angle of 45° is emitted. The image sensor 10c can capture an image of the subject to which only the light having the polarization angle of 90° is emitted. The image sensor 10d can capture an image of the subject to which only the light having the polarization angle of 135° is emitted.

With the imaging device 1 including the polarization sensor 10A illustrated in FIG. 20 instead of the polarization sensor 11, the polarization demosaic process performed by the polarization demosaic unit 52 becomes unnecessary, and thus it becomes possible to reduce the processing load.

[9. Effects]

The imaging device includes the imaging unit 2, the signal separating unit 5, the normal line calculating unit 6, and the distance estimation unit 7. The imaging unit 2 includes the plurality of polarization lights 21, 22, 23, and 24 having different polarization directions of light emitted to the subject 100 and the polarization sensor 11 and captures an image of the subject 100 that is simultaneously irradiated with the light from the plurality of polarization lights 21, 22, 23, and 24. The signal separating unit 5 separates pixel signals corresponding to each of the polarization directions from the image captured by the imaging unit 2 and generates an image for every polarization direction. The normal line calculating unit 6 calculates a normal line on the surface of the subject from the image for every polarization direction by photometric stereo. The distance estimation unit 7 estimates the shape of the subject on the basis of the normal line calculated by the normal line calculating unit. As a result, the imaging device 1 can accurately measure the three-dimensional shape of a moving object.

The imaging device 1 further includes the storage unit that stores the light source direction and polarization direction correspondence table 55 that is correspondence information in which the polarization lights 21, 22, 23, and 24, the polarization directions of light emitter by the polarization lights 21, 22, 23, and 24, and directions of the polarization lights 21, 22, 23, and 24 with respect to the subject 100 are associated with each other. The signal separating unit 5 estimates a polarization model indicating a correspondence relationship between any polarization direction and the luminance of each pixel in an image of the subject irradiated with light having that polarization direction on the basis of the luminance of each pixel in the image for every polarization direction and calculates the luminance of each pixel in the image for each of the polarization lights 21, 22, 23, and 24 on the basis of the polarization model and the correspondence information. As a result, the imaging device 1 can calculate accurate luminance of each pixel in the image for each of the polarization lights 21, 22, 23, and 24.

The normal line calculating unit 6 calculates the normal line on the surface of the subject 100 on the basis of the luminance of each pixel in the image for each of the polarization lights 21, 22, 23, and 24 and the correspondence information. As a result, the imaging device 1 can calculate a more accurate normal line.

In the plurality of polarization lights 21, 22, 23, and 24, the polarization filters $F_1$, $F_2$, $F_3$, and $F_4$ having different polarization directions are provided on the light emission surfaces of the light sources $L_1$, $L_2$, $L_3$, and $L_4$, respectively. As a result, the imaging device 1 can increase the number of light source directions without increasing the cost only by, for example, increasing the number of light sources that emits white light and polarization directions of light transmitted by polarization filters provided to the light sources.

The polarization sensor 11 includes the pixel array 13 and the polarization filter 14. In the pixel array 13, a plurality of imaging elements is arrayed in a matrix shape. The polarization filter 14 selectively causes light of different polarization directions associated with the imaging elements to enter the imaging elements. As a result, the imaging device 1 can capture an image for each of a plurality of light rays having different polarization directions by the single pixel array 13.

The polarization sensor 11 includes the beam splitters 15a, 15b, 15c, and 15d, the image sensors 10a, 10b, 10c, and 10d, and the polarization filters 11a, 11b, 11c, and 11d. The beam splitters 15a, 15b, 15c, and 15d divide incident light into a plurality of light beams. The image sensors 10a, 10b, 10c, and 10d receive respective light beams. The polarization filters 11a, 11b, 11c, and 11d are arranged between the image sensors 10a, 10b, 10c, and 10d and the beam splitters 15a, 15b, 15c, and 15d and have different polarization directions for each of the image sensors 10a, 10b, 10c, and 10d. As a result, the imaging device 1 does not need to perform the polarization demosaic process, and thus it becomes possible to reduce the processing load.

The imaging method includes: by a computer, capturing, by the polarization sensor 11, an image of the subject that is simultaneously irradiated with light from a plurality of lights having different polarization directions, the light emitted to the subject 100; separating a pixel signal corresponding to each of the polarization directions from the image captured and generating an image for each of the polarization directions by the polarization sensor 11; calculating a normal line on the surface of the subject from the image for each of the polarization directions by photometric stereo; and estimating the shape of the subject on the basis of the normal line. As a result, the imaging method can accurately measure the three-dimensional shape of a moving object.

The information processing device 3 includes the storage unit, the signal separating unit 5, the normal line calculating unit 6, and the distance estimation unit 7. The storage unit stores the light source direction and polarization direction correspondence table 55 that is correspondence information in which the plurality of polarization lights 21, 22, 23, and 24 having different polarization directions of light emitted to the subject 100, polarization directions of light emitted by the polarization lights 21, 22, 23, and 24, and directions of the polarization lights 21, 22, 23, and 24 with respect to the subject are associated with each other. The signal separating unit 5 separates pixel signals corresponding to each of the polarization directions from the image in which the subject 100 simultaneously irradiated with light from the plurality of polarization lights 21, 22, 23, and 24 is imaged by the polarization sensor 11 and generates an image for each of the lights on the basis of the correspondence information. The normal line calculating unit 6 calculates the normal line on the surface of the subject 100 from the image for each of the polarization lights 21, 22, 23, and 24 by the photometric stereo. The distance estimation unit 7 estimates the shape of the subject 100 on the basis of the normal line calculated by the normal line calculating unit 6. As a result, the information processing device 3 can accurately measure the three-dimensional shape of a moving object.

The information processing method includes, by a computer: storing the light source direction and polarization direction correspondence table 55 which is correspondence information in which a plurality of lights 21, 22, 23, and 24 having different polarization directions of light emitted to the subject 100, the polarization directions of light emitted by the lights 21, 22, 23, and 24, and directions of the lights 21, 22, 23, and 24 with respect to the subject 100 are associated with each other; separating pixel signals corresponding to each of the polarization directions from an image, in which the subject 100 simultaneously irradiated with light from the plurality of polarization lights 21, 22, 23, and 24 is captured by the polarization sensor 11, and generating an image for each of the polarization lights 21, 22, 23, and 24 on the basis of the correspondence information; calculating a normal line on the surface of the subject 100 from the image for each of the polarization lights 21, 22, 23, and 24 by photometric stereo; and estimating the shape of the subject 100 on the basis of the normal line. Thus, the information processing method can accurately measure the three-dimensional shape of a moving object.

Note that the effects described herein are merely examples and are not limiting, and other effects may also be achieved.

Note that the present technology can also have the following configurations.

(1)

An imaging device including:

an imaging unit including a plurality of lights having different polarization directions of light emitted to a subject and a polarization sensor and captures an image of the subject that is simultaneously irradiated with the light from the plurality of lights;

a separating unit that separates a pixel signal corresponding to each of the polarization directions from an image captured by the imaging unit and generates an image for each of the polarization directions;
a calculating unit that calculates a normal line on a surface of the subject from the image for each of the polarization directions by photometric stereo; and
an estimation unit that estimates a shape of the subject on a basis of the normal line calculated by the calculating unit.

(2)
The imaging device according to (1), further including:
a storage unit that stores correspondence information in which each of the lights, a polarization direction of light emitted by the light, and a direction of the light with respect to the subject are associated with each other,
wherein the separating unit estimates a polarization model indicating a correspondence relationship between a polarization direction and luminance of each pixel in an image of the subject irradiated with light having the polarization direction on a basis of luminance of each pixel in the image for each of the polarization directions and calculates luminance of each pixel in an image for each of the lights on a basis of the polarization model and the correspondence information.

(3)
The imaging device according to (2),
wherein the calculating unit calculates the normal line on the surface of the subject on a basis of luminance of each pixel in the image for each of the lights and the correspondence information.

(4)
The imaging device according to any one of (1) to (3),
wherein the plurality of lights includes polarization filters having different polarization directions from each other on a light emission surface of a light source.

(5)
The imaging device according to any one of (1) to (4),
wherein the polarization sensor comprises:
a pixel array in which a plurality of imaging elements is arrayed in a matrix shape; and
a polarization filter that selectively causes light having different polarization directions associated with the imaging elements to enter the imaging elements.

(6)
The imaging device according to any one of (1) to (4),
wherein the polarization sensor comprises:
a beam splitter that splits incident light into a plurality of light beams;
an image sensor that receives each of the light beams; and
a polarization filter disposed between the image sensor and the beam splitter, the polarization filter having a different polarization direction for each of the image sensors.

(7)
An imaging method including the steps of: by a computer,
capturing, by a polarization sensor, an image of a subject that is simultaneously irradiated with light from a plurality of lights, light emitted to a subject by which having different polarization directions;
separating a pixel signal corresponding to each of the polarization directions from the image captured by the polarization sensor and generating an image for each of the polarization directions;
calculating a normal line on a surface of the subject from the image for each of the polarization directions by photometric stereo; and
estimating a shape of the subject on a basis of the normal line.

(8)
An information processing device including:
a storage unit that stores correspondence information in which a plurality of lights having different polarization directions of light emitted to a subject, the polarization directions of light emitted by the lights, and directions of the lights with respect to the subject are associated with each other;
a separating unit that separates a pixel signal corresponding to each of the polarization directions from an image, in which the subject simultaneously irradiated with light from the plurality of lights is captured by a polarization sensor, and generates an image for each of the lights on a basis of the correspondence information;
a calculating unit that calculates a normal line on a surface of the subject from the image for each of the lights by photometric stereo; and
an estimation unit that estimates a shape of the subject on a basis of the normal line calculated by the calculating unit.

(9)
An information processing method including, by a computer:
storing correspondence information in which a plurality of lights having different polarization directions of light emitted to a subject, the polarization directions of light emitted by the lights, and directions of the lights with respect to the subject are associated with each other;
separating a pixel signal corresponding to each of the polarization directions from an image, in which the subject simultaneously irradiated with light from the plurality of lights is captured by a polarization sensor, and generating an image for each of the lights on a basis of the correspondence information;
calculating a normal line on a surface of the subject from the image for each of the lights by photometric stereo; and
estimating a shape of the subject on a basis of the normal line.

REFERENCE SIGNS LIST

1 IMAGING DEVICE
2 IMAGING UNIT
3 INFORMATION PROCESSING DEVICE
4 CALIBRATION UNIT
5 SIGNAL SEPARATING UNIT
6 NORMAL LINE CALCULATING UNIT
7 DISTANCE ESTIMATION UNIT
10 CAMERA
11 POLARIZATION SENSOR
12 IMAGING CONTROL UNIT
51 PREPROCESSING UNIT
52 POLARIZATION DEMOSAIC UNIT
53 POLARIZATION MODEL ESTIMATING UNIT
54 POLARIZATION LUMINANCE CALCULATING UNIT
55 LIGHT SOURCE DIRECTION AND POLARIZATION DIRECTION CORRESPONDENCE TABLE

The invention claimed is:
1. An imaging device, comprising:
an imaging unit that includes
a plurality of lights, wherein
each of the plurality of lights is configured to emit light on a subject, and a polarization direction of the light emitted by each of the plurality of lights is different, and a polarization sensor configured to capture a first image of the subject that is simultaneously irradiated with the light from the plurality of lights; and a central processing unit (CPU) configured to:
separate a pixel signal corresponding to each of the polarization directions from the captured first image;
generate a second image for each of the polarization directions;
calculate a normal line on a surface of the subject from the second image for each of the polarization directions by photometric stereo;
estimate a shape of the subject based on the normal line;
store correspondence information that associates each of the plurality of lights, the polarization directions, and directions of the plurality of lights with respect to the subject;
estimate a polarization model that indicates a correspondence relationship between the polarization directions and luminance of each pixel in the first image of the subject,
wherein the first image of the subject is irradiated with the light having the polarization direction based on luminance of each pixel in the second image for each of the polarization directions; and
calculate the luminance of each pixel in the second image for each of the plurality of lights based on the polarization model and the correspondence information.

2. The imaging device according to claim 1,
wherein the CPU is further configured to calculate the normal line on the surface of the subject based on the luminance of each pixel in the second image for each of the plurality of lights and the correspondence information.

3. The imaging device according to claim 1, wherein the plurality of lights includes polarization filters on a light emission surface of a light source, and
a polarization direction of each of the polarization filters is different.

4. The imaging device according to claim 1,
wherein the polarization sensor comprises:
a pixel array in which a plurality of imaging elements is arrayed in a matrix shape; and
a polarization filter configured to selectively cause light having the polarization directions associated with the plurality of imaging elements to enter the plurality of imaging elements.

5. The imaging device according to claim 1,
wherein the polarization sensor comprises:
a plurality of beam splitters configured to split incident light into a plurality of light beams;
a plurality of image sensors, wherein each of the plurality of image sensors is configured to receive a respective light beam of the plurality of light beams; and
a plurality of polarization filters between the plurality of image sensors and the plurality of beam splitters, wherein a polarization direction of each of the plurality of polarization filters for each of the plurality of image sensors is different.

6. An imaging method, comprising:
by a central processing unit (CPU):
capturing, by a polarization sensor, a first image of a subject that is simultaneously irradiated with light from a plurality of lights, wherein a polarization direction of the light emitted by the plurality of lights is different;
separating a pixel signal corresponding to each of the polarization directions from the captured first image,
generating a second image for each of the polarization directions;
calculating a normal line on a surface of the subject from the second image for each of the polarization directions by photometric stereo; and
estimating a shape of the subject based on the normal line;
storing correspondence information that associates each of the plurality of lights, the polarization directions, and directions of the plurality of lights with respect to the subject;
estimating a polarization model that indicates a correspondence relationship between the polarization directions and luminance of each pixel in the first image of the subject,
wherein the first image of the subject is irradiated with the light having the polarization direction based on luminance of each pixel in the second image for each of the polarization directions; and
calculating the luminance of each pixel in the second image for each of the plurality of lights based on the polarization model and the correspondence information.

7. An information processing device, comprising:
a central processing unit (CPU) configured to:
store correspondence information that associates
a plurality of lights having light emitted to a subject, wherein a polarization direction of the light emitted by each of the plurality of lights is different,
the polarization directions of the light emitted by each of the plurality of lights, and
directions of the plurality of lights with respect to the subject;
separate a pixel signal corresponding to each of the polarization directions from a first image, in which the subject simultaneously irradiated with light from the plurality of lights, wherein the first image is captured by a polarization sensor, and
generate a second image for each of the plurality of lights based on the correspondence information;
calculate a normal line on a surface of the subject from the second image for each of the lights by photometric stereo; and
estimate a shape of the subject based on the normal line;
estimate a polarization model that indicates a correspondence relationship between the polarization directions and luminance of each pixel in the first image of the subject,
wherein the first image of the subject is irradiated with the light having the polarization direction based on luminance of each pixel in the second image for each of the polarization directions; and
calculate the luminance of each pixel in the second image for each of the plurality of lights based on the polarization model and the correspondence information.

8. An information processing method, comprising:
by a central processing unit (CPU):
storing correspondence information that associates
a plurality of lights having light emitted to a subject, wherein a polarization direction of the light emitted by each of the plurality of lights is different,
the polarization directions of the light emitted by each of the plurality of lights, and directions of the plurality of lights with respect to the subject, separating a pixel signal corresponding to each of the polarization directions from a first image, in which the subject simultaneously irradiated with light from the plurality of lights, wherein the first image is captured by a polarization sensor;

generating a second image for each of the plurality of lights based on the correspondence information;

calculating a normal line on a surface of the subject from the second image for each of the plurality of lights by photometric stereo;

estimating a shape of the subject based on the normal line;

estimating a polarization model that indicates a correspondence relationship between the polarization directions and luminance of each pixel in the first image of the subject, wherein the first image of the subject is irradiated with the light having the polarization direction based on luminance of each pixel in the second image for each of the polarization directions; and calculating the luminance of each pixel in the second image for each of the plurality of lights based on the polarization model and the correspondence information.

* * * * *